US008272039B2

(12) United States Patent
Bennett et al.

(10) Patent No.: US 8,272,039 B2
(45) Date of Patent: Sep. 18, 2012

(54) PASS-THROUGH HIJACK AVOIDANCE TECHNIQUE FOR CASCADED AUTHENTICATION

(75) Inventors: James S. Bennett, Oakville (CA); Peter Hawkins, Bath (GB); Brent R. Phillips, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 12/114,014

(22) Filed: May 2, 2008

(65) Prior Publication Data

US 2009/0276838 A1 Nov. 5, 2009

(51) Int. Cl.
*G06F 7/04* (2006.01)
*G06F 15/16* (2006.01)
*G06F 17/30* (2006.01)
*H04L 29/06* (2006.01)

(52) U.S. Cl. ......... 726/7; 726/5; 726/6; 726/27; 726/28; 726/29

(58) Field of Classification Search .................. 726/4–7, 726/27–29
See application file for complete search history.

(56) References Cited

U.S. PATENT DOCUMENTS

| 6,317,838 | B1 * | 11/2001 | Baize .............................. 726/11 |
| 7,047,560 | B2 * | 5/2006 | Fishman et al. .................. 726/6 |
| 7,349,957 | B1 * | 3/2008 | Matthews et al. ............. 709/223 |
| 7,487,217 | B2 * | 2/2009 | Buckingham et al. ........ 709/206 |
| 7,730,527 | B2 * | 6/2010 | Charles et al. .................. 726/11 |
| RE41,811 | E * | 10/2010 | Gutman et al. ................ 709/229 |
| 7,840,708 | B2 * | 11/2010 | Smith et al. ................... 709/246 |
| 2001/0019559 | A1 * | 9/2001 | Handler et al. ................ 370/468 |
| 2003/0028808 | A1 * | 2/2003 | Kameda ........................ 713/201 |
| 2003/0237002 | A1 * | 12/2003 | Oishi et al. ..................... 713/201 |
| 2004/0010724 | A1 * | 1/2004 | Brown et al. .................. 713/202 |
| 2004/0073793 | A1 * | 4/2004 | Takeda .......................... 713/168 |
| 2004/0107364 | A1 * | 6/2004 | Shin .............................. 713/201 |
| 2004/0268142 | A1 * | 12/2004 | Karjala et al. ................ 713/200 |
| 2006/0062228 | A1 * | 3/2006 | Ota et al. ....................... 370/401 |
| 2006/0136555 | A1 | 6/2006 | Patrick et al. |
| 2006/0161770 | A1 * | 7/2006 | Goto et al. .................... 713/167 |
| 2006/0294366 | A1 | 12/2006 | Nadalin et al. |
| 2007/0121596 | A1 | 5/2007 | Kurapati et al. |
| 2007/0128899 | A1 * | 6/2007 | Mayer .......................... 439/152 |
| 2007/0234061 | A1 | 10/2007 | Teo |
| 2008/0065884 | A1 * | 3/2008 | Emeott et al. ................ 713/168 |
| 2008/0120714 | A1 * | 5/2008 | Monette et al. ................. 726/11 |
| 2008/0159310 | A1 * | 7/2008 | Senga et al. .................. 370/401 |

* cited by examiner

*Primary Examiner* — Jeffrey Pwu
*Assistant Examiner* — Jayesh Jhaveri
(74) *Attorney, Agent, or Firm* — Mitch Harris, Atty at Law, LLC; Andrew M. Harris; Mark C. Vallone

(57) ABSTRACT

A hijack avoidance technique avoids presenting an access to more than one of a chain of authentication objects, such as a chain of Lightweight Directory Access Protocol (LDAP) authenticators. A pre-filter determines whether an authentication object should be presented with the access by comparing either all or a portion of a domain suffix, an IP address, or other identification other than the user ID with predetermined values. If the filter criterion is met, the associated authentication object accepts or rejects the access. Otherwise, the access is passed to the next authentication object in the chain. The first authentication object may be associated with a hosting entity and successive authentication objects each associated with different customers of the hosting entity. By virtue of the filtering, each authentication object is presented only with a particular subset of all of the possible access identifiers, which avoids presenting all of the previously unauthenticated accesses to each authentication object in the chain.

19 Claims, 3 Drawing Sheets

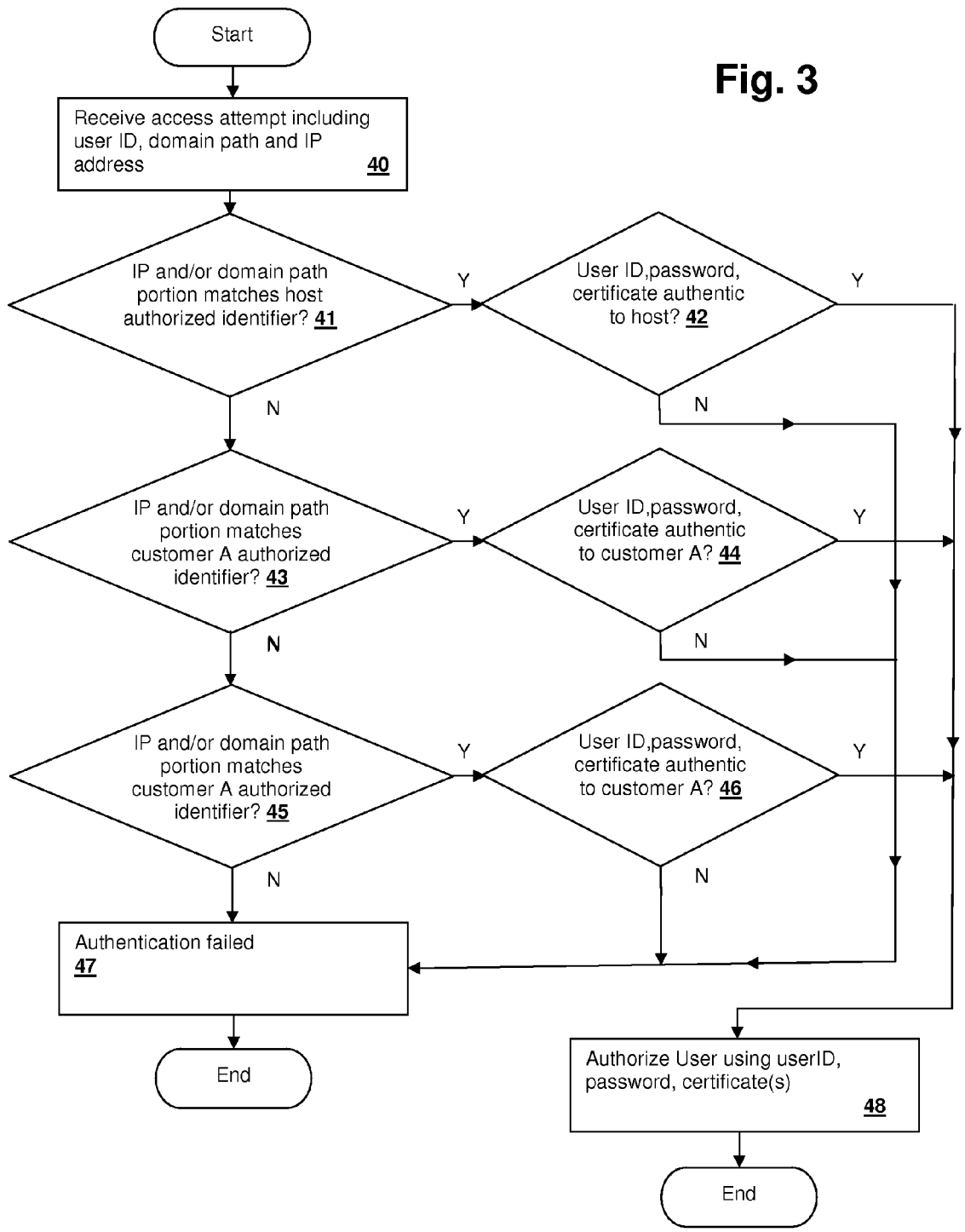

PASS-THROUGH HIJACK AVOIDANCE TECHNIQUE FOR CASCADED AUTHENTICATION

BACKGROUND OF THE INVENTION

1. Field of the Invention

The present invention is related to authentication in server systems serving multiple customers, and more specifically to an authentication system that reduces the number of authentication access points by passing through authentication requests that do not meet specific criteria to the next authentication access point.

2. Description of Related Art

Authentication in server systems providing support for multiple customers are typically constructed using a serial authentication model. For example, in Lightweight Directory Access Protocol (LDAP) as implemented in the JAVA Authentication and Authorization Service (JAAS), each authentication access point necessarily tests for authenticity and/or authorization of each access, as a failed authentication request is rejected by the access point. (JAVA is a trademark of Sun Microsystems, Inc.) Therefore, JAAS-based authentication systems are configured sequentially and to some degree hierarchically, since in order for an access attempt to pass to the last possible authenticator, the access attempt has to be "chained" through each of the preceding authenticators.

Such authentication structures are subject to tampering or hijack threats in which an either legal or illegal access to administration of one of the LDAP authenticators permits the hijacker to inserter (and therefore authorize) a user id that, for example, has privileges on a host serving all of the customers, has privileges at a global administrative level, or has privileges within another customer's application level. Further, if logging is enabled at an LDAP instance, the accesses to a downstream customer's application level may be logged by an upstream LDAP instance that belongs to another customer, exposing information about user IDs, times of access and other information, such as IP addresses, that may be considered proprietary to the other customer.

Sequential authentication structures are also more susceptible to denial-of-service (DoS) attacks in general, since an attack on one LDAP instance early in the chain can block accesses to downstream LDAP instances.

Therefore, it would be desirable to provide a sequential authentication model that does not expose proprietary information between customers, that avoids providing access to a particular LDAP's managed identities through administration of another LDAP, and has improved immunity to DoS attacks.

BRIEF SUMMARY OF THE INVENTION

The invention is embodied in a computer-performed method, computer program product and computer system that authenticates clients accessing a computer network serving multiple customers.

The authentication is performed with a serial chain of authenticators, with at least some of the authenticators having an associated pre-access filter that determines whether or not to present an access to the corresponding authenticator, or pass the access forward in the chain. The filter criteria may be one or more of: a portion of user ID, such as the domain suffix, an IP address range or specific IP address. The authenticators may be objects such as JAAS objects, or serially accessible authentication objects. The authenticators may be arranged and filtered such that only one authenticator is ever accessed for a particular user ID or IP address range.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

FIG. 3 is a flow chart of a method in accordance with an embodiment of the present invention.

DETAILED DESCRIPTION OF THE INVENTION

The present invention relates to computer security software, and specifically authentication systems that handle accesses for multiple customers and optionally one or more hosting entities, such as Internet web servers, e-mail servers, media servers and electronic commerce service providers. The present invention applies particularly to authentication schemes in which multiple authenticators such as authentication objects serially process an access attempt. A filter is employed in front of each or a subset of the authentication objects, each of which may be associated with and administrated by a separate entity, such as separate customers serviced by a common service. The filter applies a criteria other than a user ID match, such as matching a portion or all of a domain name associated with the user ID and/or a network address such as an IP address, to determine whether or not a given authentication object should be provided with an access attempt. By skipping authentication objects for which the filter criterion does not match, a serial authentication scheme is provided which bars potential hijacking attempts that originate from an IP address or domain that is authorized for the host or customer, but are targeted at another customer's (or the host's) authentication list or other scheme. The technique also reduces the effectiveness of DoS attacks by reducing the number of authentication queries for a given access down to as few as one authentication query, rather than attempting to authenticate each access attempt serially at each authentication object in the system.

Figure 1:
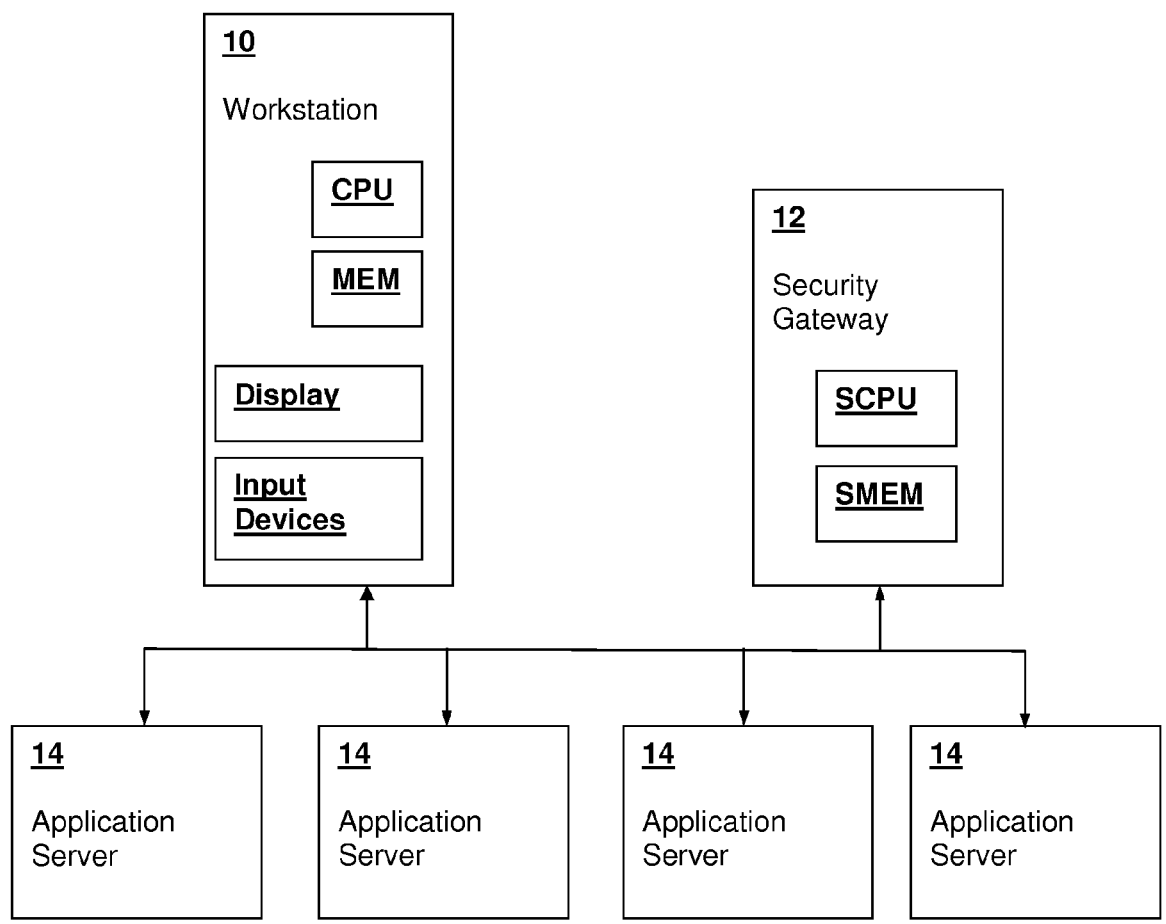
FIG. 1 is a block diagram illustrating a networked computer system in which techniques according to an embodiment of the present invention are practiced.

Referring now to FIG. 1, a networked computer system in which an embodiment of the present invention is practiced is depicted in a block diagram. A workstation computer 10 includes a workstation processor CPU coupled to a workstation memory MEM that contains program instructions for execution by workstation processor CPU. Workstation computer 10 is also depicted as including a graphical display Display and input devices Input Devices, such as mice and keyboards, for interacting with user interfaces including login screens and other user interfaces for interacting with other computers connected to the network, for example, administration screens for administering authentication and authorization profiles used by a security gateway server 12 that is also coupled to the network. Security gateway 12 includes a server processor SCPU for executing server program instructions and a server memory SMEM for storing the server program instructions. Security gateway 12 and workstation computer system 10 are coupled to a set of application servers 14 that provide application-level services such as web and eCommerce applications for customers of a hosting entity that manages the system of FIG. 1. The network may include wireless local area networks (WLANs), wired local-area networks (LANs), wide-area networks (WANs) or any other suitable interconnection that provides communication between application servers 14, security gateway 12 and workstation computer 10. Further, the present invention concerns authentication objects and factories and authentication functionality that is not limited to a specific computer system or network configuration. Finally, the specification of a security gateway 12 and workstation 10 and the location of their specific memories MEM and SMEM does not imply a specific client-server relationship or hierarchical organization, as the techniques of the present invention may be employed in distributed systems in which no particular machine is identified as a server, but at least one of the machines provides an instance and functionality of multiple authentication objects in accordance with an embodiment of the present invention. The authentication objects may be downloaded local objects such as JAVA objects (JAVA is a trademark of Sun Microsystems, Inc.) or the authentication objects' functionality may be implemented wholly within security gateway 12, within one or more of application servers 14 or any other location within a computer network. In essence, a series of local authentication objects, or a set of interfaces to a series of authentication objects is provided at workstation computer system 10 or another location within the computer network. The authentication interfaces or objects may receive input from a user login interface, or from an automatic access interface such as an application instance that contains pre-determined access identification information. The authentication objects or interfaces then process access attempts according to methods and structures of the present invention, as described in further detail below.

Figure 2:
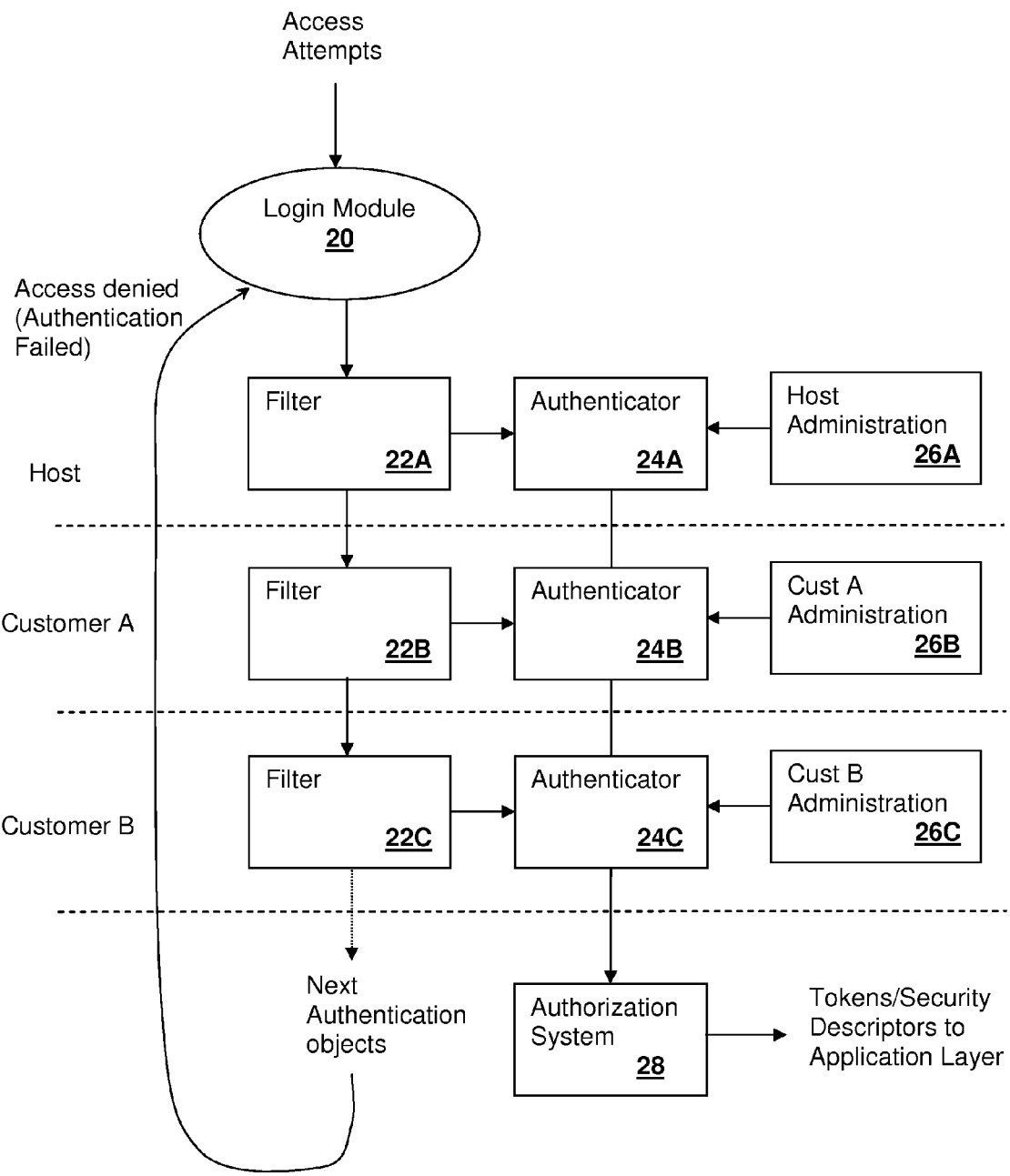
FIG. 2 is a pictorial diagram showing a relationship of objects within the system of FIG. 1.

Referring now to FIG. 2, a pictorial diagram illustrating a relationship between objects and processes within the system of FIG. 1 is shown. The depicted program structure is only one of many possible program structures for implementing the authentication methodology described herein, and is provided as an example of an embodiment of a program structure in accordance with an embodiment of the present invention. In the Figure, access attempts are received by a login module 20 that receives a user identifier comprising a user ID and domain name, for example, an Internet e-mail identifier string such as "userID@.domainname.com" as well as other information such as the Internet protocol (IP) address from which the access (or a proxy to the access) originated. The string may be provided from a typical user interface screen, or via an automatic process such as an application or system login having stored user information. The access attempt associated with the user identifier and IP address is then passed to a first one 22A of a series of filters 22A-22C that have associated authenticators 24A-24C. Authenticators 24A-24C, may be Lightweight Directory Access Protocol (LDAP) authenticators implemented as JAVA Authentication and Authorization Service (JAAS) objects, or any other serialized authenticators that authenticate an access or pass the access on to a next authenticator.

In the depicted example, filter 22A and authenticator 24A are associated with a host providing services to a number of customers, e.g., an eCommerce, email and web services host. Filter 22B and authenticator 24B are associated with a first customer Customer A and filter 22C and authenticator 24C are associated with a second customer Customer B. In traditional serial authentication systems, an access provided from login module 20 would be passed to each of authenticators 24A-24C until one of authenticators 24A-24C authenticates the user attempting access. Therefore, a user ID associated with Customer B would be "seen" and possibly logged by each of authenticators 24A and 24B before being finally authorized by authenticator 24C. However, in the present invention, filters 22A-22C apply filter criteria before attempting to authenticate a user by matching a portion of the domain name, e.g., by matching the "domainname.com" portion of the e-mail identifier given in the example above and/or the IP address, with a known set of domains or IP addresses associated with the host or customer corresponding to the filter. For example, if the host is xyzcorp.com, customer A is abccorp.com and customer a is npocorp.org, filter 22A may pass only users having domain suffix @xyzcorp.com to authenticator 24A, filter 22B may pass only users having domain suffix @abccorp.com to authenticator 24B and filter 22C may pass only users having domain suffix npocorp.org to authenticator 24C. An authorization system receives accesses from authenticated users as provided by one of authenticators 24A-24C, and grants tokens and/or a security descriptor that informs application layers and the operating system(s) as to the privileges permitted to the particular user (or software) accessing the system.

The filtering operation described above provides several useful behaviors. With respect to entity privacy, userIDs associated with npocorp.org will only be "seen" by authenticator 24C and therefore, while they may be known to the hosting provider, customer A cannot log their accesses at authenticator 24B, as those accesses never arrive at authenticator 24B, due to filtering by filter 22B. If Customer A's authenticator 24B were to log accesses for Customer B, a list of Customer A's users could be built, potentially compromising sensitive business information proprietary to Customer A. Also, a DoS attack using an invalid user specification, e.g., "invaliduser@abccorp.com" will result in authentication attempts only authenticator 24B, reducing the amount of time required to reject the access. Finally, since authenticators 24A-24C may be individually administrated by separate administration services 26A-26C, a user having administrative access for managing the authentication list for an authenticator, e.g. authenticator 24C, cannot successfully add a user corresponding to another customer or the host to the authentication list, since the domain suffix and/or IP address will not meet the filter criteria at filter 22C. Otherwise, for example, customer B's administrator could add a user "admin@xyzcorp.com" so that a user presenting that identification would be authenticated, if no filtering were employed, by authenticator 24C. Once authenticated, if authorization system 28 recognizes "admin@xyzcorp.com" as corresponding to a user with administrative privileges over the resources of the host (and possibly all of the customers), administrative access to authenticator 24C could permit hijacking unauthorized portions of the system. Hijacking could also potentially occur between customers.

Referring now to FIG. 3, a method in accordance with an embodiment of the present invention is illustrated in a flowchart. In the depicted method, an access attempt including userID, domain path and IP address is received (step 40). The IP address and/or domain path portion is compared with a list of predetermined authorized identifiers for the host and if a match is found (decision 41) the access is passed to the host's authentication object, which determines if the userID, password and/or certificate are authentic (decision 42). If the IP address and/or domain path portion does not match the host's list, then the access is passed to the next authenticator and the IP address and/or domain path portion is compared with a list of predetermined authorized identifiers for Customer A. If a match is found (decision 43) the access is passed to Customer A's authentication object, which determines if the userID, password and/or certificate are authentic (decision 44). Next, if the IP address and/or domain path portion does not match Customer A's list, then the access is passed to the next authenticator and the IP address and/or domain path portion is compared with a list of predetermined authorized identifiers for Customer B. If a match is found (decision 45) the access is passed to Customer B's authentication object, which determines if the userID, password and/or certificate are authentic (decision 46). If the access is authenticated by any of decision 42, decision 44 or decision 46, then the user is authorized according to the userID, password and/or certificates (step 48), otherwise authentication fails (step 47).

As demonstrated above, the present invention provides a new way of implementing and operating a serial authentication scheme that removes hijacking possibilities between multiple entities served by a single service provider, protects user ID information as between customers, and reduces the latency of response to DoS attacks. The techniques of the present invention may also be employed in serial authorization schemes, or access schemes in which authentication and authorization are both performed prior to passing an access along to the next authenticator when authentication and/or authorization fails at a given authentication object. While the techniques described herein are illustrated with respect to JAAS objects performing LDAP authentication, the present invention may be employed in any serial authentication scheme, and may be performed for the entire chain of authentication objects, or only a subset of the authentication objects.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method for authenticating a client access to a networked computer system, the computer-performed method comprising:
   receiving an access attempt at a login module of an authentication process executing at a particular node of the networked computer system;
   first filtering the access attempt by the authentication process according to an identifier other than a certificate or a username, the first filtering comprising comparing the identifier to a first predetermined set of multiple accepted identities to determine whether or not to authenticate the access attempt using a first authentication object interface accessible by the authentication process;
   responsive to the first filtering determining to authenticate the access attempt using the first authentication object interface, the authentication process authenticating the access attempt by passing the access attempt to the first authentication object interface;
   responsive to the first filtering determining not to authenticate the access attempt using the first authentication object interface, second filtering the access attempt by the authentication process according to the identifier other than the certificate or the username, the second filtering comprising comparing the identifier to a second predetermined set of multiple accepted identities that differs from the first predetermined set of multiple accepted identities to determine whether to authenticate the access attempt using a second authentication object interface accessible by the authentication process; and
   responsive to the second filtering determining to authenticate the access attempt using the second authentication object interface, the authentication process authenticating the access attempt by passing the access attempt to the second authentication object interface.

2. The computer-performed method of claim 1, wherein the first authentication object interface and the second authentication object interface are interfaces to objects local to the authentication process, wherein the first authentication object interface and the second authentication object interface directly return corresponding results to the authentication process indicating whether or not the access attempt has been authenticated.

3. The computer-performed method of claim 1, wherein the first authentication object interface and the second authentication object interface are interfaces to remote objects accessible within the networked computer system, wherein the first authentication object interface and the second authentication object interface return corresponding results to the authentication process via the networked computer system indicating whether or not the access attempt has been authenticated.

4. The computer-performed method of claim 3, wherein the first and second predetermined set of multiple accepted identities comprise ranges of network addresses associated with a corresponding one of the first and second authentication object interfaces.

5. The computer-performed method of claim 1, wherein the first authentication object interface is associated with a hosting entity and the second authentication object interface is associated with a customer of the hosting entity, wherein the authenticating the access attempt by passing the access attempt to the second authentication object interface authenticates users associated with customers of the hosting entity.

6. The computer-performed method of claim 1, wherein the first authentication object interface is associated with a particular customer served by the networked computer system and wherein the first filtering comprises filtering users having access administrated by the particular customer, wherein the authenticating the access attempt by passing the access attempt to the second authentication object interface authenticates users associated with other customers.

7. A networked computer system, comprising:
   a processor, a computer-readable memory and a computer readable tangible storage device;
   program instructions, stored on the storage device for execution by the processor via the memory, for receiving an access attempt at a login module of an authentication process executing at a particular node of the networked computer system;
   program instructions, stored on the storage device for execution by the processor via the memory, for first filtering the access attempt by the authentication process according to an identifier other than a certificate or a username, wherein the program instructions for first filtering the access attempt compare the identifier to a first predetermined set of multiple accepted identities to determine whether or not to authenticate the access attempt using a first authentication object interface accessible by the authentication process;
   program instructions, stored on the storage device for execution by the processor via the memory, for, responsive to the first filtering determining to authenticate the access attempt using the first authentication object interface, authenticating the access attempt by the authentication process passing the access attempt to the first authentication object interface;

program instructions, stored on the storage device for execution by the processor via the memory, for, responsive to the first filtering determining not to authenticate the access attempt using the first authentication object interface, second filtering the access attempt by the authentication process according to the identifier other than the certificate or the username, wherein the program instructions for second filtering the access attempt compare the identifier to a second predetermined set of multiple accepted identities that differs from the first predetermined set of multiple accepted identities to determine whether to authenticate the access attempt using a second authentication object interface accessible by the authentication process; and program instructions, stored on the storage device for execution by the processor via the memory, for, responsive to the second filtering determining to authenticate the access attempt by the authentication process passing the access attempt to the second authentication object interface.

8. The networked computer system of claim 7, wherein the first authentication object interface and the second authentication object interface are interfaces to objects local to the authentication process, and wherein the networked computer system further comprises program instructions, stored on the storage device for execution by the processor via the memory, for directly returning corresponding results from the first authentication object interface and the second authentication object interface to the authentication process, each of the corresponding results indicating whether or not the access attempt has been authenticated.

9. The networked computer system of claim 7, wherein the first authentication object interface and the second authentication object interface are interfaces to remote objects accessible within the networked computer system, and wherein the networked computer system further comprises program instructions, stored on the storage device for execution by the processor via the memory, for returning corresponding results from the first authentication object interface and the second authentication object interface to the authentication process via the networked computer system, each of the corresponding results indicating whether or not the access attempt has been authenticated.

10. The networked computer system of claim 7, wherein the identifier is a network address included in the received access attempt.

11. The networked computer system of claim 10, wherein the first and second predetermined set of multiple accepted identities comprise ranges of network addresses associated with a corresponding one of the first and the second authentication object interfaces.

12. The networked computer system of claim 7, wherein the first authentication object interface is associated with a hosting entity and the second authentication object interface is associated with a customer of the hosting entity, wherein the program instructions for authenticating the access attempt by the authentication process passing the access attempt to the second authentication object interface authenticate users associated with customers of the hosting entity.

13. The networked computer system of claim 7, wherein the first authentication object interface is associated with a particular customer served by the networked computer system and wherein the program instructions for first filtering the access attempt filter users having access administrated by the particular customer, and wherein the program instructions for authenticating the access attempt by the authentication process passing the access attempt to the second authentication object interface authenticate users associated with other customers.

14. A computer program product comprising a computer-readable tangible storage device and computer-readable program instructions stored on the computer-readable tangible storage device, the program instructions, when carried out by a processor of a networked computer system, implement a method of authenticating, the method comprising:

receiving an access attempt at a login module of an authentication process executing at a particular node of the networked computer system;

first filtering the access attempt by the authentication process according to an identifier other than a certificate or a username, the first filtering comprising comparing the identifier to a first predetermined set of multiple accepted identities to determine whether or not to authenticate the access attempt using a first authentication object interface accessible by the authentication process;

responsive to the first filtering determining to authenticate the access attempt using the first authentication object interface, authenticating the access attempt by the authentication process passing the access attempt to the first authentication object interface;

responsive to the first filtering determining not to authenticate the access attempt using the first authentication object interface, second filtering the access attempt according to the identifier other than the certificate or the username, the second filtering comprising comparing the identifier to a second predetermined set of multiple accepted identities that differs from the first predetermined set of multiple accepted identities to determine whether to authenticate the access attempt using a second authentication object interface accessible by the authentication process; and responsive to the second filtering determining to authenticate the access attempt using the second authentication object interface, authenticating the access attempt by the authentication process passing the access attempt to the second authentication object interface.

15. The computer program product of claim 14, wherein the first authentication object interface and the second authentication object interface are interfaces to objects local to the authentication process, wherein the first authentication object interface and the second authentication object interface directly return corresponding results to the authentication process indicating whether or not the access attempt has been authenticated.

16. The computer program product of claim 14, wherein the first authentication object interface and the second authentication object interface are interfaces to remote objects accessible within the networked computer system, wherein the first authentication object interface and the second authentication object interface return corresponding results via the networked computer system to the authentication process if the access attempt has not been authenticated.

17. The computer program product of claim 16, wherein the first and second predetermined set of multiple accepted identities comprise ranges of network addresses associated with a corresponding one of the first and second authentication object interfaces.

18. The computer program product of claim 14, wherein the first authentication object interface is associated with a hosting entity and the second authentication object interface is associated with a customer of the hosting entity, wherein the authenticating the access attempt by the authentication process passing the access attempt to the second authentication object interface authenticates users associated with customers of the hosting entity.

19. The computer program product of claim 14, wherein the first authentication object interface is associated with a particular customer served by the networked computer system and wherein the first filtering comprises filtering users having access administrated by the particular customer, wherein the authenticating the access attempt by the authentication process passing the access attempt to the second authentication object interface authenticates users associated with other customers.

* * * * *